(12) United States Patent
DuPasquier et al.

(10) Patent No.: US 6,537,703 B2
(45) Date of Patent: *Mar. 25, 2003

(54) POLYMERIC MESOPOROUS SEPARATOR ELEMENTS FOR LAMINATED LITHIUM-ION RECHARGEABLE BATTERIES

(75) Inventors: Aurelien DuPasquier, Amiens (FR); Jean-Marie Tarascon, Amiens (FR)

(73) Assignee: Valence Technology, Inc., Henderson, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,353

(22) Filed: Nov. 12, 1998

(65) Prior Publication Data
US 2001/0008734 A1 Jul. 19, 2001

(51) Int. Cl.[7] .......................... H01M 2/16; H01M 2/18; B32B 5/18
(52) U.S. Cl. ...................... 429/254; 429/251; 429/252; 428/317.9; 428/323
(58) Field of Search ................ 429/251, 252, 429/254; 428/317.9, 323

(56) References Cited

U.S. PATENT DOCUMENTS

| 3,351,495 A | | 11/1967 | Larsen et al. |
|---|---|---|---|
| 3,930,886 A | * | 1/1976 | Mesiti et al. |
| 3,953,241 A | * | 4/1976 | Langer et al. ............... 429/142 |
| 3,953,566 A | | 4/1976 | Gore |
| 4,849,144 A | * | 7/1989 | McLoughlin ............... 264/45.9 |
| 4,985,296 A | | 1/1991 | Mortimer, Jr. |
| 5,015,542 A | * | 5/1991 | Chaney, Jr. et al. ........... 429/56 |
| 5,418,091 A | * | 5/1995 | Gozdz et al. ................ 429/252 |
| 5,460,904 A | | 10/1995 | Gozdz et al. |
| 5,478,668 A | * | 12/1995 | Gozdz et al. ................ 429/127 |
| 5,635,293 A | * | 6/1997 | Korleski et al. ........... 428/317.9 |
| 5,964,903 A | | 10/1999 | Gao et al. |

FOREIGN PATENT DOCUMENTS

JP  9-237621  *  9/1997

* cited by examiner

Primary Examiner—Patrick Ryan
Assistant Examiner—Jonathan Crepeau
(74) Attorney, Agent, or Firm—Roger A. Williams; Michael D. Ross

(57) ABSTRACT

A mesoporous polymeric membrane for use as an ionically-conductive inter-electrode separator in a rechargeable battery cell contains a like distribution of mesopore voids throughout a membrane matrix. The porous membrane is capable of absorbing significant amounts of electrolyte solution to provide suitable ionic conductivity for use in rechargeable battery cells. The addition of inert particulate filler to the coating composition provides further strength in the body of the membrane and provides particulate support within the membrane mesopores which prevents collapse of the voids at cell fabrication laminating temperatures and thus maintains electrolyte absorption capability.

7 Claims, 3 Drawing Sheets

POLYMERIC MESOPOROUS SEPARATOR ELEMENTS FOR LAMINATED LITHIUM-ION RECHARGEABLE BATTERIES

BACKGROUND OF THE INVENTION

The present invention relates to rechargeable electrolytic battery cells comprising polymeric film composition electrodes and separator elements, and metallic foil or mesh current collectors, which are typically laminated under heat and pressure to form a unitary battery cell structure. In particular, the invention provides a simple and economical method of preparing such separator element films or membranes which are highly porous and thus capable of absorbing and retaining substantial amounts of electrolyte solution even after high-temperature lamination processing to thereby provide high ionic conductivity and cycling stability over long periods of rechargeable battery storage and use in a broad range of temperatures.

Electrolytic battery cells particularly suited to use of the present invention include Li-ion intercalation cells of the type described in U.S. Pat. No. 5,460,904 which have preferably comprised separator elements such as described in U.S. Pat. No. 5,418,091, the disclosures of which patents are incorporated herein by reference. Such cells are fabricated of respective positive and negative electrode elements comprising finely-divided active materials, such as lithium-source $LiMn_2O_4$ and carbon, dispersed in a polymeric matrix and formed into flexible layers or membranes. These elements are laminated to an interposed electrically-insulating separator membrane, usually comprising a similar polymeric material, which will ultimately contain a uniformly distributed organic solution of a lithium salt to serve as an electrolytic, ion-conducting bridge between the electrodes and enable the intercalation of Li ions flowing reversibly to and from the active materials of those electrodes during the charge and discharge cycles of the battery cell. Finally, to facilitate the concomitant flow of electrons in the battery cell circuit, each of the positive and negative electrode elements has an associated current collector element which also serves as a terminal base for the attachment of a conductor leading, in use, to a utilization device.

In the fabrication and use of these earlier-described battery cells, there were employed separator membrane element compositions comprising a polymer-compatible plasticizer compound which was in part removed from the finished cell separator component in preparation for activation by the addition of electrolyte solution. These polymeric separator compositions, as well as the similar polymeric battery electrode compositions, were particularly unique in that removal of the incorporated compatible plasticizer, typically by extraction with a polymer-inert solvent, did not create a porosity in the polymeric matrix, but rather preconditioned such matrix for ready absorption of activating electrolyte.

Yet earlier polymeric battery cell separator elements which, on the other hand, relied on matrix porosity to promote electrolyte absorption were described in U.S. Pat. No. 3,351,495. Preparation of such separator elements did, however, rely upon a similar solvent extraction operation to physically remove from the solidified composition an incompatible, so-called "plasticizer", component along with entrained inert filler particles in order to achieve the resultant porosity.

In accordance with the present invention, battery separator membrane elements are provided which comprise a degree of mesoporosity capable of yielding improved electrolyte solution absorption and resultant high ionic conductivity, yet are prepared without reliance upon time-consuming and expensive extraction operations. On the contrary, the present battery cell element preparation entails merely an simple element membrane coating or casting process which forms the preferred porosity by differential evaporation of coating composition fluid vehicle components.

SUMMARY OF THE INVENTION

The present invention provides a method of preparing mesoporous polymeric matrix layers or membranes which serve equally well as separator and electrode elements in laminated Li-ion intercalation battery cells. Such membranes are prepared in a simple coating or film-casting operation utilizing a polymeric composition comprising a combination of polymer-solvent and -nonsolvent coating vehicle components which, due to respective evaporation rates, results in a fine dispersion of the less volatile nonsolvent throughout the solidifying polymer matrix layer during the primary solvent evaporation operation. The ultimate evaporation and diffusion of such nonsolvent component from the polymer matrix after the latter has gelled or solidified as a result of the evaporation of the solvent component yields the mesoporous matrix structure which will readily absorb electrolyte solution to provide a high level of ionic conductivity in the battery cell.

In addition to the matrix polymer and coating vehicle mixture, the coating composition preferably comprises a finely-divided inert filler, such as silica, the particles of which are initially uniformly dispersed in the coated layer, but which apparently migrate in part to concentrate as agglomerates in the dispersed nonsolvent vehicle droplets during the gelling of the matrix film. Thus, the filler not only imparts structural strength to the final layer in its uniform dispersal, but also provides support to maintain the open structure of the mesopores after diffusion of the nonsolvent vehicle and further extends additional such support during the compressive tendencies of the thermal lamination operation which later joins the separator and electrode elements into the unitary battery cell structure.

Complementary electrode coating compositions comprise, along with the matrix polymer and solvent/nonsolvent mix, respective electrolytically active components, such a powdered carbon and intercalation compound, e.g., a $LiMn_2O_4$ spinel. Although these active components are dispersed in the coating compositions in finely-divided form, they do not significantly interfere with the mesopore formation, since their particles are normally in the range of an order of magnitude larger than the mesopore voids.

After completion of the formation of mesoporous separator and electrode elements, the thermal lamination of the respective electrode elements with metallic grid or foil current collectors followed by lamination of those electrode subassemblies with an interposed separator element are substantially as described in the above-incorporated patent specifications. Completion of battery cell fabrication includes activation by application and mesopore membrane absorption of electrolyte solution, and final packaging, in the usual manner.

BRIEF DESCRIPTION OF THE DRAWING

The present invention will be described with reference to the accompanying drawing of which.

DESCRIPTION OF THE INVENTION

The present invention essentially comprises a method for preparing mesoporous polymeric separator and electrode elements for rechargeable electrolytic battery cells without resort to expensive and time-consuming solvent extraction operations. The invention further comprises the resulting separator and electrode elements, as well as the rechargeable battery cells fabricated by thermal lamination assembly of such separator and electrode elements with conductive collector elements. Such assembly and the procedures used in fabricating the battery cells are for the most part described in U.S. Pat. Nos. 5,470,357; 5,540,741; and their related patent disclosures.

Figure 1:
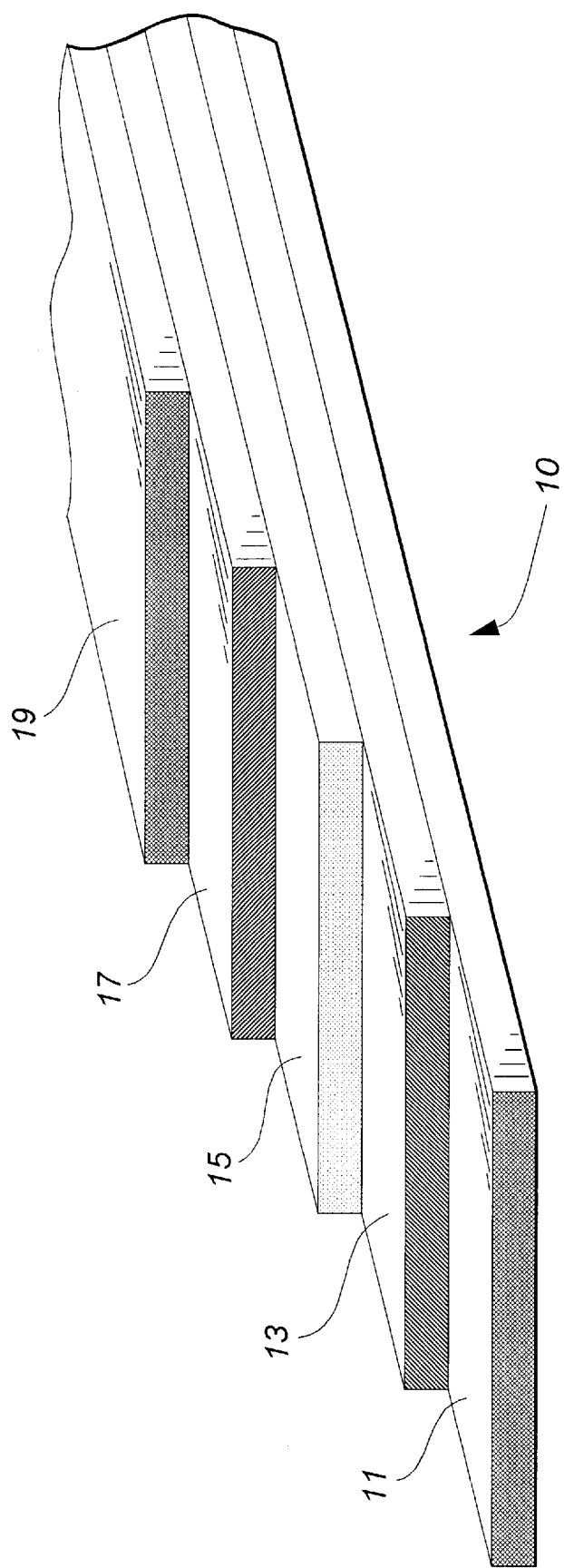
FIG. 1 is a diagrammatic representation of a composite Li-ion battery cell incorporating separator and electrode membrane elements of the present invention.

A typical battery cell assembly 10 is depicted in FIG. 1 and comprises positive and negative electrode membrane elements 13, 17 between which is disposed a separator element 15, prepared according to the present invention, in which lithium salt electrolyte solution will ultimately be absorbed. The electrodes 13, 17 respectively comprise a lithiated intercalation compound, e.g., $LiMn_2O_4$, and a complementary material capable of reversibly intercalating lithium ions, e.g., carbon in the form of petroleum coke or graphite. Electrically-conductive current collectors 11, 19, preferably of aluminum and copper, or nickel, are adhered to respective electrode elements 13, 17, preferably in a preliminary lamination to form electrode sub-assemblies, and these sub-assemblies are bonded, such as by thermal lamination, to intermediately situated separator element 15 to form a unitary battery cell 10. In order to facilitate subsequent processing of the cell, particularly to incorporate electrolyte solution, at least one, preferably both, of the collector elements is permeable, such as in the form of a perforate foil or expanded metal grid.

Although the polymeric material utilized in the preparation of the present separator, and likewise electrode, elements may be selected from a wide variety of previously employed polymers and copolymers of, for example, vinyl chloride, acrylonitrile, vinyl acetate, vinyl fluoride, vinylidene chloride, and vinylidene fluoride; and acrylonitrile and vinyl chloride or vinylidene chloride, and vinylidene fluoride and tetrafluoroethylene, trifluoroethylene, chloro-trifluoroethylene, or hexafluoropropylene, the latter copolymers of about 75% to 97% by weight vinylidene fluoride (VdF) and 3% to 25% by weight hexafluoropropylene (HFP) are particularly preferred, the proportion of VdF comonomer generally varying with its molecular weight.

While not essential to the formulation and processing of the separator and electrode elements of the present invention, in order to provide an optimum degree of flexibility and thermal cohesion during lamination, the polymeric compositions may further comprise a suitable amount of a compatible organic plasticizer, such as dibutyl phthalate. Each of the positive and negative electrode compositions normally further comprise, usually in finely-divided dispersed form, the electrolytically-active components which are essentially materials capable of providing and intercalating lithium ions during the discharge/charge cycles of the ultimate battery.

The method comprising the present invention resides principally in a unique variation from previously described battery cell fabrication practices in the preparation of the coating composition used in casting the separator, and electrode, film membranes. Whereas previous practices entailed the formulation of an homogeneous coating solution of matrix polymer and coating vehicle solvent, with plasticizer if desired, the coating composition now employed includes, in addition to a primary polymer solvent, such as acetone or tetrahydrofuran, a liquid coating vehicle component of lesser volatility, such as a lower alcohol, which is essentially a nonsolvent for the polymer, but which is nonetheless miscible to a significant degree with the primary solvent. Such a mixed solvency coating vehicle enables the initial casting of clear, homogeneous polymer solution layers; however, upon the predominant evaporation of primary solvent and resulting enrichment of nonsolvent in the coating layer, localized gelling or coalescence of the polymer occurs throughout the layer to encompass myriad fine droplets of the nonsolvent component. The lower volatility of the nonsolvent results in the maintenance of the uniform droplet distribution until the polymer membrane has gelled sufficiently to sustain a mesoporous structure upon subsequent evaporation of the nonsolvent component.

In a preferred embodiment of the invention, the coating composition includes a significant amount of inert particulate filler, such as silica or alumina, which is initially uniformly distributed throughout the body of the cast layer. This filler component contributes substantially to the physical strength of the final membrane, as such fillers did in prior art compositions; however, in its present utilization the particulate filler adds a distinctive function in that during the evaporation of the primary solvent vehicle and resulting coalescence of the polymer membrane matrix the filler particles tend to accumulate in the more fluid nonsolvent droplets as the vehicle evaporation proceeds and ultimately agglomerate in greater measure within the voids initially occupied by the nonsolvent to thereby support and maintain the final mesoporosity of the separator membrane.

Figure 2:
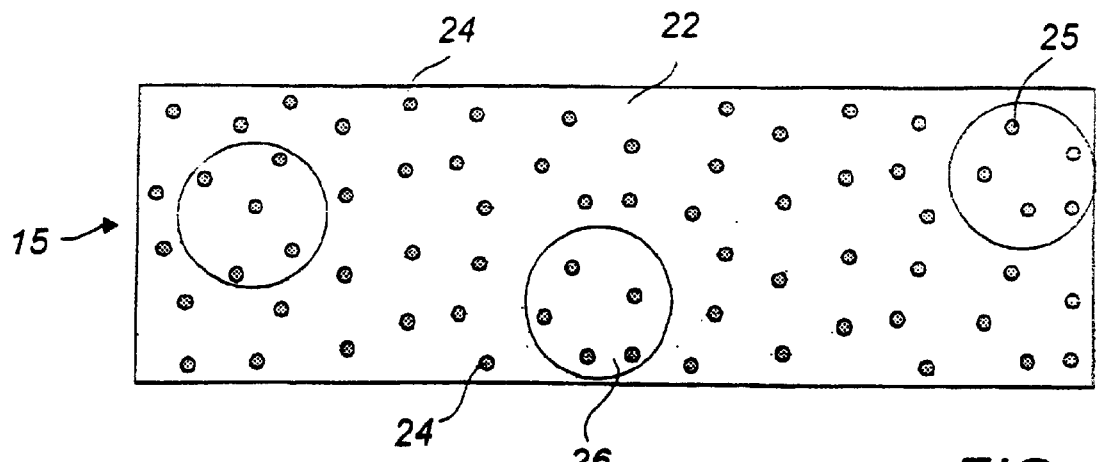
FIG. 2 is a diagrammatic representation, in section, of a segment of a separator membrane of the present invention showing relative dispersion of nonsolvent vehicle droplets and inert filler particles during early stage gelling of the membrane polymer.
Figure 3:
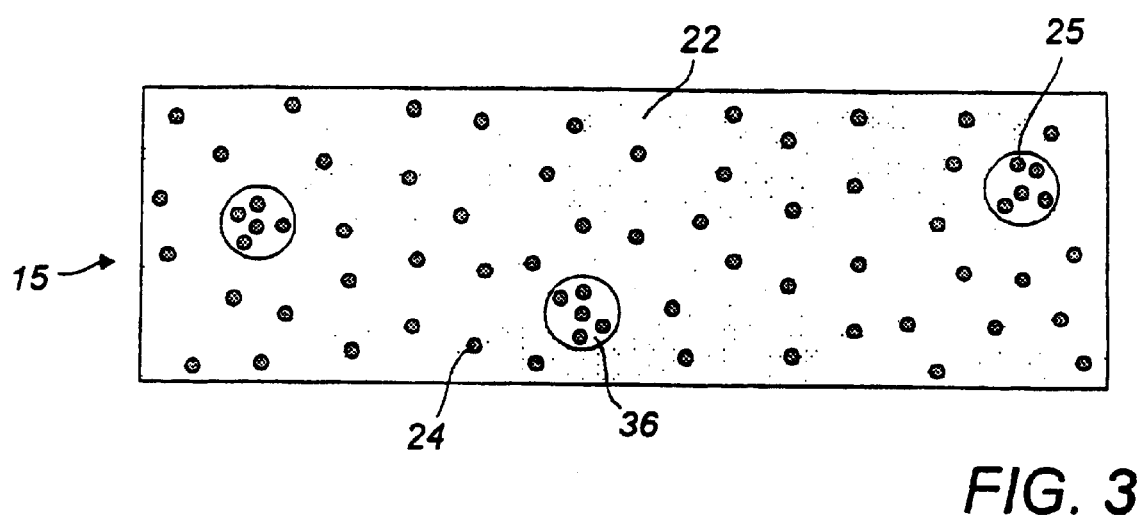
FIG. 3 is a diagrammatic representation, in section, of a segment of a separator membrane of the present invention showing relative dispersion of nonsolvent vehicle droplets and inert filler particles during final stage gelling of the membrane polymer.

This advantageous function of the particulate filler in combination with the specific solvency imbalance of the coating composition may be seen in the diagrammatic representations of FIGS. 2 and 3. In FIG. 2, the section 15 of a separator membrane coated layer comprises a continuous matrix 22 of polymer solution which has gelled by evaporation of primary solvent to a degree sufficient to isolate droplets of nonsolvent 26. Filler particles 24, 25 are dispersed throughout the layer mass, i.e., in both polymer matrix 22 and nonsolvent droplets 26, in substantially the same uniform distribution as when the homogeneous composition was initially cast. Upon further gelling by primary solvent evaporation, however, as represented in FIG. 3, the increased viscosity of the polymer matrix 22 fixes the distribution of filler particles 24, while particles 25 within the more fluid nonsolvent droplets 36 are free to agglomerate as the nonsolvent evaporates. Further agglomeration may occur until the polymer matrix solidifies sufficiently to maintain the size of pores 36.

It should be noted in these considerations that the representations of FIGS. 2 and 3 are shown grossly out of proportion for the sake of clarity. The relative distribution of a particulate filler, such as a fumed silica, within voids created from nonsolvent dispersion in a polymer matrix may be more closely realized from the actual size scales in which the silica particles approximate 10 nm, while photomicrographic examination reveals encompassing void structures to be about 1 $\mu$m in diameter.

Figure 4:
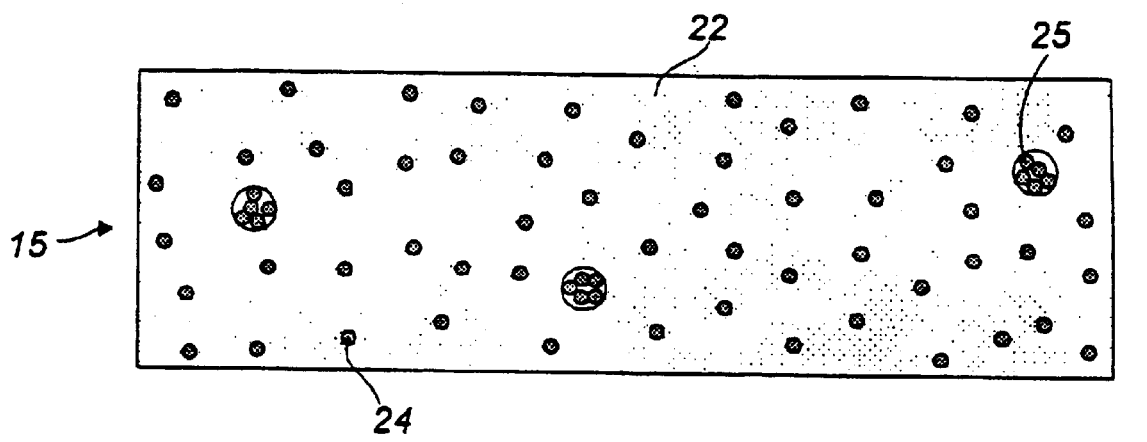
FIG. 4 is a diagrammatic representation, in section, of a segment of a separator membrane of the present invention showing relative dispersion of nonsolvent-replacing mesopore voids and inert filler particles after exposure of the membrane polymer to laminating temperature and pressure.

The further representation of void and particulate filler seen in FIG. 4 is intended to depict the disposition of filler particle agglomerates in their ultimate role of supporting the pore structure of the separator membrane in the extreme conditions of battery cell fabrication lamination with heat and pressure which could otherwise readily collapse the membrane pores and greatly restrict the critical absorption of electrolyte. As shown in maximum compression, the particles of the agglomerates maintain an open network of voids which provide the persistent mesoporosity of separator 15. The integrity mesopores in electrodes membranes 13, 17, on the other hand, is principally maintained by the larger size of particles in those compositions.

While the present invention may be utilized with any of the battery electrode and electrolyte components mentioned in the aforementioned patent specifications and in similar related publications, in the interest of simplicity the invention will be described with reference made to a few representative compositions which are included in the following examples.

EXAMPLE 1

A coating composition for a preferred embodiment of a separator membrane 15 was prepared according to the present invention by dissolving 3.0 g of an 88:12 VdF:HFP copolymer of about 380×10$^3$ MW (Atochem Kynar FLEX 2801) in about 20 ml acetone. Into this solution was stirred about 10 ml ethanol in which the copolymer is substantially insoluble, and 2.0 g of fumed silica (SiO$_2$) to form a composition of clear, smooth consistency. The composition was cast at a wet thickness of about 250 $\mu$m upon the surface of abherent polyethylene terephthalate film and allowed to dry by evaporation of coating vehicle components in moderately circulating air at about 30° C. The resulting separator membrane of about 50 $\mu$m thickness was self-supporting and appeared homogeneous when stripped from the casting substrate. Under photomicrographic examination the membrane exhibited uniform distributions of circular voids and silica particles throughout the polymer matrix with a greater density of such particles within the confines of the voids than in the matrix in general, much as depicted in FIG. 2.

EXAMPLE 2

A comparative sample of the above-mentioned general embodiment of the invention, viz., a mesoporous membrane without dispersed inert filler, was prepared in the manner of Example 1 with the exception that the silica component of the coating composition was withheld. In order to compensate for the greater resulting fluidity of the composition and achieve a comparable membrane thickness, the coating was cast at about 350 $\mu$m. The resulting separator membrane was of marginal physical strength and appeared, upon photomicrographic examination, to comprise the same mesoporous structure as that of Example 1, but was devoid of dispersed filler particles.

EXAMPLE 3

A variant membrane sample was prepared in the manner of Example 1 with the exception that the nonsolvent isopropanol was substituted for the ethanol. The resulting membrane was visually indistinguishable from that of Example 1.

EXAMPLE 4

An additional variant membrane sample was prepared in the manner of Example 1 with the exception that the nonsolvent methanol was substituted for the ethanol. The resulting membrane was visually indistinguishable from that of Example 1.

EXAMPLE 5

A control membrane sample was prepared from the components of Example 1 with the exception that about 8 ml of acetone was substituted for the ethanol, thereby providing a coating vehicle consisting only of polymer solvent. The composition was cast and dried in like manner to yield a membrane of similar macro appearance as that of Example 1. Photomicrographic examination revealed, however, that the membrane was comprised solely of silica particles uniformly distributed throughout the polymer matrix without the presence of a mesoporous structure.

EXAMPLE 6

In order to test the efficacy of the present invention, a comparative prior art separator membrane sample was prepared substantially in the manner of Example 13 of the above-referenced U.S. Pat. No. 5,418,091 by casting from a solvent dispersion a FLEX 2801 VdF:HFP copolymer composition comprising about 20% SiO$_2$ and 25% dibutyl phthalate plasticizer. Following the described prior art procedure, the resulting flexible separator membrane was extracted with diethyl ether to remove the plasticizer component and thereby condition the membrane for electrolyte absorption. Examination of the extracted membrane revealed a dispersion of silica particles throughout the polymer matrix, but no discernible pores, as is consistent with the description in the referenced patent.

EXAMPLE 7

Figure 5:
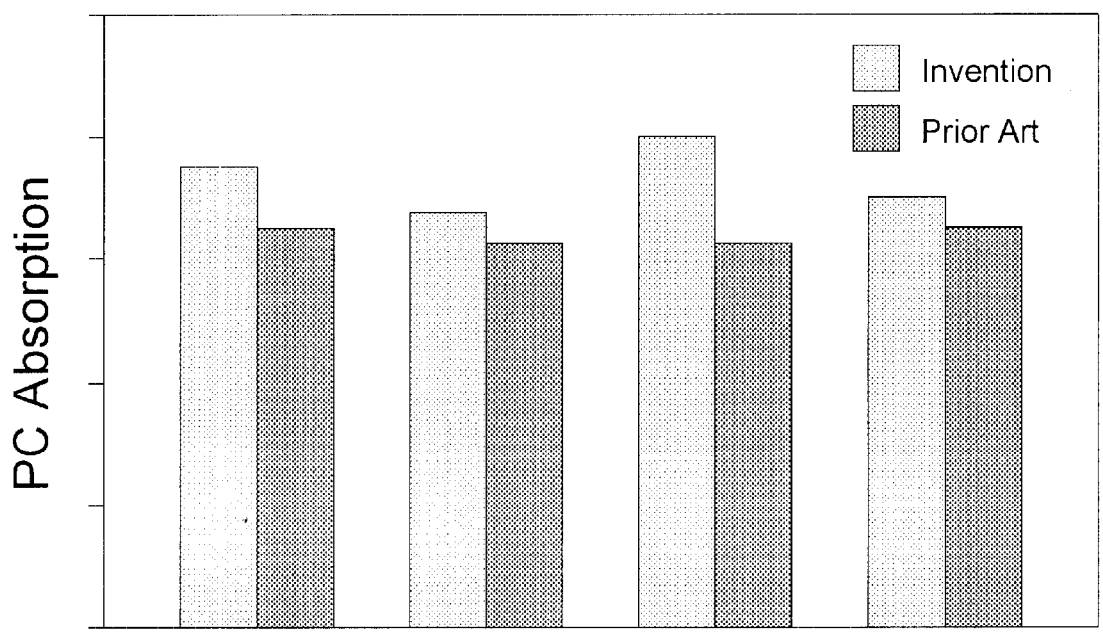
FIG. 5 is a graph of comparative electrolyte absorption in separator membrane samples of similar polymer prepared according to the present invention and the prior art.

A comparison was made of the electrolyte absorption capabilities of four individual pairs of samples of invention and prior art separator membranes prepared according to each of Examples 1 and 6. To this end, the samples were weighed and then immersed for a few minutes in propylene carbonate (PC), a lithium salt solvent typically used as a vehicle for battery cell activating electrolyte solution. After immersion, the samples were cleaned of surface accumulation of PC and reweighed to determine the amount of PC absorption. The graphs of comparative absorption by these sample pairs appear in FIG. 5 and indicate the generally greater simulated electrolyte absorbency of the mesoporous membranes of the present invention.

EXAMPLE 8

Figure 6:
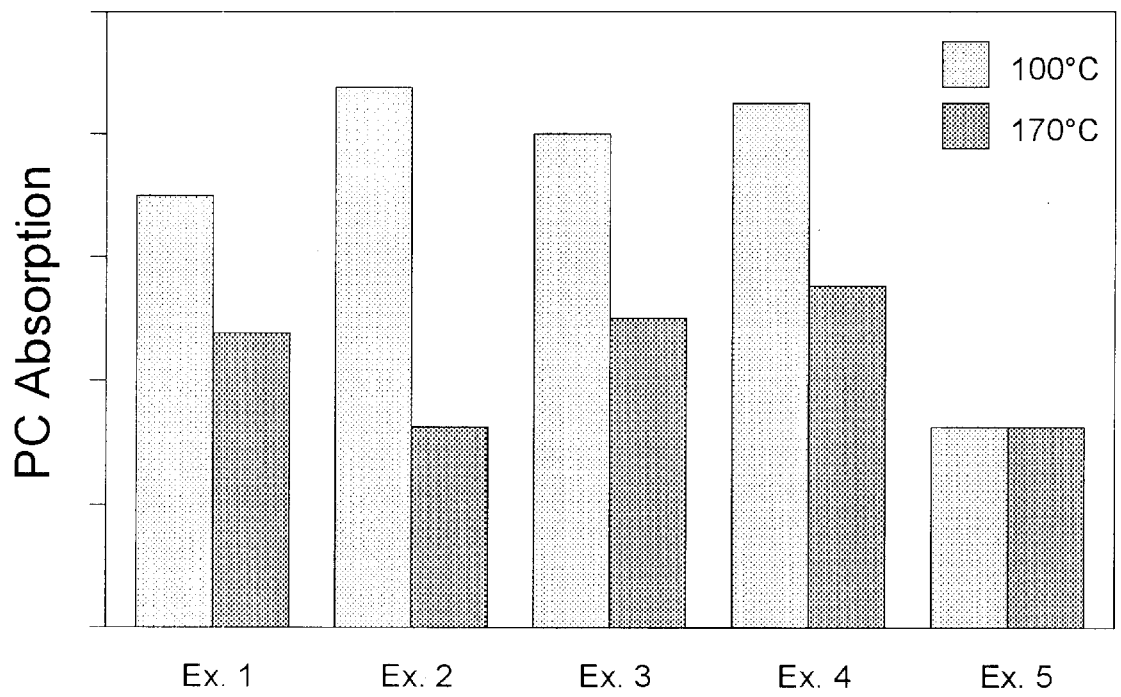
FIG. 6 is a graph of comparative electrolyte absorption in mesoporous separator membranes prepared from various compositions and subjected to moderate and high laminating temperatures.

Samples of each of the invention and control separator membranes of Examples 1 through 5 were tested for simulated electrolyte absorption after exposure to various temperature conditions which would likely be encountered during thermal lamination of separator and electrode elements in the fabrication of battery cells. Increases in such laminating temperatures would be expected to reduce porosity and electrolyte absorption capability. After exposure to laminating pressure and temperatures of 100° C. and 170° C., the samples were tested for PC absorption in the manner of Example 7. The results of comparative absorption for membranes of each of the examples are shown in the graphs of FIG. 6. Of particular note in these test results are the high levels of electrolyte absorption initially exhibited by the mesoporous membranes of the invention, as well as the significant retained absorbancies of preferred embodiments of Examples 1, 3, and 4 comprising structure-supporting particulate filler. The susceptibility of membranes without filler, as in Example 2, to mesopore collapse at temperatures above the melting point of the matrix polymer is apparent in these results. Such membranes, with their exceptional initial absorption, would be useful, of course, in low-temperature or non-laminated battery cell applications. As is further apparent, the nonporous structure of the control membrane of Example 5 is little affected by temperature, yet exhibits minimal electrolyte absorption under any conditions.

EXAMPLE 9

The ultimate efficacy of mesoporous separator and electrode membranes prepared according to the invention was tested in comparative laminated battery cells fabricated in the manner of FIG. 4 of referenced U.S. Pat. No. 5,460,904. A prior art plasticizer-extracted cell was prepared as in Example 15 of that patent, while a cell of the present invention was prepared in the following manner. As referenced in FIG. 1 of the specification, positive electrode membrane 13 was cast at about 375 $\mu$m from a composition of 2.5 g FLEX 2801 VdF:HFP copolymer, 1 g SP conductive carbon, 5 g $LiMn_2O_4$, 40 ml acetone, and 15 ml ethanol. The resulting mesoporous membrane was laminated with an expanded aluminum foil collector element 11 in a heated roller device at about 150° C. A negative electrode membrane 17 was cast at about 450 $\mu$m from a composition of 2.5 g FLEX 2801 VdF:HFP copolymer, 1 g SP conductive carbon, 5 g microbead carbon, 40 ml acetone, and 15 ml ethanol. The resulting mesoporous membrane was laminated with an expanded copper foil collector element 19 in a heated roller device at about 150° C. A mesoporous separator element 15 prepared according to above Example 1 was positioned between and in contact with the subassembly electrode elements 13, 17, and the assembly was laminated in the device at about 120° C. to form a unitary battery cell 10 which was then activated by immersion in an EC:PC:$LiPF_6$ electrolyte solution as described in the referenced patent.

The battery cells of the prior art and of the foregoing fabrication with elements prepared according to the present invention were cycled at a constant 10 mA between cutoff voltages of 3.0 V and 4.5 V at a C/5 cycling rate in the manner described at Example 13 of the referenced U.S. Pat. No. 5,460,904. Both cells performed similarly in the manner depicted in FIG. 2 of that patent and exhibited discharge capacities in the range of about 20–25 mAh.

The foregoing examples are intended to be illustrative only and not limiting upon the present invention. It is expected that other polymers and solvent/nonsolvent combinations yielding similar results will occur to and may be achieved by the skilled artisan in the light of the above description through the exercise of routine experimentation without departing from the scope of the invention as recited in the appended claims.

What is claimed is:

1. A mesoporous polymeric membrane for use as an ionically conductive inter-electrode separator in rechargeable battery cell, said membrane comprising a polymeric matrix and distributed throughout said matrix, a plurality of voids and a multiplicity of inert filler particles, wherein only a portion of said particles is situated within said voids, and wherein said particles are distributed within said voids in a greater spatial density than within said matrix.

2. A membrane according to claim 1 wherein the polymeric matrix comprises a polymer or copolymer of at least one monomer selected from the group consisting of vinyl chloride, acrylonitrile, vinyl acetate, vinyl fluoride, vinylidene chloride, vinylidene fluoride and hexafluoropropylene.

3. A membrane according to claim 1 wherein said polymeric matrix comprises a copolymer of vinylidene fluoride with 3% to 25% by weight hexafluoropropylene.

4. A rechargeable battery cell structure comprising a positive electrode element, a negative electrode element, and a separator membrane element disposed therebetween wherein said separator membrane comprises a polymeric matrix having distributed therein a plurality of voids and a multiplicity of inert filler particles, said particles being distributed throughout said matrix and at least some of the particles also being completely situated within said voids.

5. A rechargeable battery structure according to claim 4 wherein said particles are distributed within said voids in a greater spatial density than within said matrix.

6. A rechargeable battery structure according to claim 4 wherein said polymeric matrix comprises a copolymer of vinylidene fluoride with 3% to 25% by weight hexafluoropropylene.

7. A rechargeable battery structure according to claim 4 wherein each of said electrode elements comprises a polymeric matrix and each of said electrode and separator elements is bonded to contiguous elements at its respective interfaces to form a unitary flexible laminate structure.

* * * * *